US011280106B2

(12) United States Patent
Herse et al.

(10) Patent No.: US 11,280,106 B2
(45) Date of Patent: Mar. 22, 2022

(54) STEEL CAP FOR AN ELECTRICITY TRANSMISSION TOWER

(71) Applicant: PILING AND CONCRETING AUSTRALIA (PCA) PTY LTD, Queensland (AU)

(72) Inventors: Allan John Herse, Queensland (AU); Robert Michael Bollman, Queensland (AU)

(73) Assignee: PILING AND CONCRETING AUSTRALIA (PCA) PTY LTD, Queensland (AU)

(*) Notice: Subject to any disclaimer, the term of this patent is extended or adjusted under 35 U.S.C. 154(b) by 0 days.

(21) Appl. No.: 16/807,675

(22) Filed: Mar. 3, 2020

(65) Prior Publication Data
US 2020/0199905 A1 Jun. 25, 2020

Related U.S. Application Data

(63) Continuation of application No. 16/084,708, filed as application No. PCT/AU2017/050230 on Mar. 15, 2017, now Pat. No. 10,612,264.

(30) Foreign Application Priority Data

Mar. 15, 2016 (AU) .............................. 2016900959

(51) Int. Cl.
*E04H 12/22* (2006.01)
*E02D 5/64* (2006.01)
(Continued)

(52) U.S. Cl.
CPC ........... *E04H 12/2292* (2013.01); *E02D 5/64* (2013.01); *E02D 37/00* (2013.01); *E04G 23/0218* (2013.01)

(58) Field of Classification Search
CPC ....... E02D 5/64; E02D 37/00; E04H 12/2292; E04G 23/0218; E04G 23/02; E04G 23/0225
See application file for complete search history.

(56) References Cited

U.S. PATENT DOCUMENTS 1,486,594 A * 3/1924 Adolphus ........... E04H 12/2292
52/154
8,511,020 B2 8/2013 Salisbury et al.
(Continued)

FOREIGN PATENT DOCUMENTS

| JP | H05346038 A | 12/1993 |
| WO | WO 1993/018253 A1 | 9/1993 |
| WO | WO 2017/156582 A1 | 9/2017 |

OTHER PUBLICATIONS

International Search Report dated May 5, 2017 by the International Searching Authority for International Application No. PCT/AU2017/050230, filed on Mar. 15, 2017 and published as WO 2017/156582 on Sep. 21, 2017 (Applicant-Piling and Concreting Australia (PCA) PTY LTD) (3 Pages).

(Continued)

*Primary Examiner* — Andrew J Triggs
(74) *Attorney, Agent, or Firm* — Ballard Spahr LLP

(57) ABSTRACT

A steel cap for structurally connecting together a new foundation and an existing tower is disclosed. The new foundation includes at least one foundation element positioned in the ground. The existing tower includes an existing foundation and a tower structure extending from and supported by the existing foundation. The steel cap comprises (a) a first element for connecting the cap to the new foundation element or foundation elements and (b) a second element for connecting the cap to the existing tower and thereby, in use, connecting together the new foundation and the existing tower.

15 Claims, 5 Drawing Sheets

(51) Int. Cl.
*E02D 37/00* (2006.01)
*E04G 23/02* (2006.01)

(56) References Cited

U.S. PATENT DOCUMENTS

| | | | |
|---|---|---|---|
| 9,057,172 B2* | 6/2015 | Soucy | E02D 17/20 |
| 9,255,408 B2 | 2/2016 | Tanaka | |
| 10,612,264 B2* | 4/2020 | Herse | E02D 5/54 |
| 2007/0245674 A1 | 10/2007 | Hubbell | |
| 2008/0236073 A1* | 10/2008 | Bagepalli | F03D 80/82 |
| | | | 52/292 |
| 2015/0159337 A1 | 6/2015 | Kellner | |
| 2016/0060889 A1* | 3/2016 | Tedesco | E04H 12/2238 |
| | | | 52/514 |
| 2019/0085582 A1 | 3/2019 | Herse | |
| 2020/0199905 A1* | 6/2020 | Herse | E02D 5/54 |

OTHER PUBLICATIONS

Written Opinion dated May 5, 2017 by the International Searching Authority for International Application No. PCT/AU2017/050230, filed on Mar. 15, 2017 and published as WO 2017/156582 on Sep. 21, 2017 (Applicant-Piling and Concreting Australia (PCA) PTY LTD) (5 Pages).

* cited by examiner

STEEL CAP FOR AN ELECTRICITY TRANSMISSION TOWER

CROSS REFERENCE TO RELATED APPLICATIONS

This application is a continuation of U.S. patent application Ser. No. 16/084,708, filed Sep. 13, 2018, which is a U.S. National Phase Application of International Application No. PCT/AU2017/050230, filed Mar. 15, 2017, which claims priority to AU 2016900959, filed Mar. 15, 2016, all of which applications are hereby incorporated by reference in their entireties.

TECHNICAL FIELD

The present invention relates to a steel cap for use with an existing electricity transmission tower or other type of tower for the purpose of extending the service life of the tower.

The present invention also relates to an assembly of (a) a new foundation for an existing tower and (b) a steel cap connected to the new foundation for the purpose of extending the service life of the tower.

The present invention also relates to a renovated tower that comprises (a) an existing tower and (b) the assembly of the new foundation and the steel cap described in the preceding paragraph.

BACKGROUND ART

Electrical transmission towers typically comprise a foundation and a tower structure extending from and supported by the foundation.

There are situations where it is more cost effective to renovate rather than replace existing electricity transmission towers.

The foundations of existing towers and the structural connections between the foundations and the tower structure of the existing towers are areas that often require renovation, with the renovation often including providing a new foundation that is connected structurally to an existing tower.

The applicant has realised that there is a need for an effective and efficient steel cap for structurally connecting together an existing tower and a new foundation to provide additional foundation for the tower.

The above description is not to be taken as an admission of the common general knowledge in Australia or elsewhere.

SUMMARY OF THE DISCLOSURE

The present invention provides a steel cap for structurally connecting together a new foundation and an existing tower, with the new foundation including at least one foundation element positioned in the ground, and with the existing tower including an existing foundation and a tower structure extending from and supported by the existing foundation, the cap comprising (a) a first element for connecting the cap to the new foundation pile or piles and (b) a second element for connecting the cap to the existing tower and thereby, in use, connecting together the new foundation and the existing tower.

The invention may be used in situations where the existing foundation of the tower can continue to contribute to the foundation support for the tower.

The invention may also be used in situations where the existing foundation of the tower has no structural value and is redundant.

The term "foundation element" is understood herein to mean any element that works in any one or more of tension, compression, bending or shear and can be positioned in the ground to support a structure. By way of example, the foundation element may be a pile.

The foundation of the existing tower may be any suitable construction. For example, the foundation may be a series of piles. Alternatively, the foundation may be a grillage. Alternatively, the foundation may be a concrete block.

The first element of the steel cap may be in the form of a plate.

The plate may be a flat steel plate.

The plate may include an opening for the foundation element of the new foundation or a plurality of openings for the multiple foundation elements of the new foundation so that the plate can be connected, for example by being bolted or welded, to the single or multiple foundation elements.

The first element of the steel cap may be formed to be positioned against the existing tower, for example against a leg of the existing tower.

The first element may be formed to extend around at least a part of the existing tower, for example around at least a part of the length of a leg of the existing tower.

For example, in a situation in which the first element is in the form of a plate, the first element may include a cut-out section in a side wall of the plate that has the same shape as a part of a transverse section of a leg of the existing tower so that the first element can be positioned against and extend around at least a part of the length of an outer profile of the leg of the existing tower.

The first element may be positioned on or at least partially embedded in the ground.

The first element may be spaced above the ground.

The second element of the steel cap may be formed to be connected to the existing tower, for example against a leg of the existing tower.

The second element may be shaped to conform to an outer profile of the existing tower, for example around at least a part of a leg of the existing tower, to maximise the contact between the second element and the existing tower.

The second element may be welded to or otherwise connected to the first element to extend from the first element.

The second element may be an elongate element.

The second element may be a shaped plate that is formed to conform to an outer profile of the existing tower to maximise the contact between the second element and the existing tower. For example, the second element may be a V-shape or other suitable shape in transverse section along the length of the plate to conform to an outer profile of a leg of the existing tower to maximise the contact between the second element and the existing tower.

The shaped plate may extend from the first element at an angle $\alpha$ to the second element, with the angle $\alpha$ being selected to be the same as an angle to the horizontal of a leg (or other suitable part) of the existing tower, to which the steel cap is connected.

With this arrangement, in use, when the steel plate is positioned horizontally adjacent the existing tower with the shaped steel plate against an outer surface of the existing tower, for example against a leg of the existing tower, there is maximum contact of the shaped steel plate and the existing tower along the length of the shaped steel plate.

With this arrangement, in use, the steel cap interconnects the new foundation and the existing tower and provides additional structural support for the existing tower.

With this arrangement, typically, the new foundation comprises a plurality of foundation elements that are driven/embedded/formed or otherwise positioned in the ground in a required array around an existing tower, for example around a leg of the existing tower, the steel cap is positioned so that the new foundation elements extend through the openings in the first element of the steel cap with the second element contacting the existing tower, for example a leg of the existing tower, the first element is connected to the new foundation elements and the second element is connected to the existing tower, thereby completing the additional structural support for the tower. By way of example, the new foundation elements may have threaded upper ends that extend through the openings in the first element and nuts are threaded onto the ends and connect the first element to the new foundation elements.

The foundation element or multiple foundation elements of the new foundation may be any suitable construction.

By way of example, the foundation element or each foundation element may be a composite micro-pile comprising a steel casing filled with grout and a high-strength central piece of threaded reinforcing steel. In use, the cased section is installed in a drilled hole in the ground and provides lateral resistance and the reinforcing bar and grout are positioned and injected respectively in the space defined by the casing and provide axial resistance.

The tower may be a lattice tower or a monopole or any other suitable tower structure.

The present invention also provides an assembly of (a) the above-described new foundation for an existing tower and (b) the above-described steel cap connected to the new foundation for the purpose of extending the service life of the tower when the assembly is structurally connected to the existing tower.

The first element of the steel cap may be bolted or welded to the foundation element or foundation elements of the new foundation.

The present invention also provides a renovated tower that comprises (a) an existing tower, (b) a new foundation, and (c) the above-described steel cap structurally interconnecting the new foundation and the existing tower.

The present invention also provides a method of renovating an existing tower that comprises (a) driving/embedding/forming or otherwise positioning a plurality of new foundation elements in the ground in a required array around an existing tower, for example around a leg (or other suitable part) of the existing tower, and thereby forming a new foundation, positioning the above-described steel cap so that the new foundation elements extend through the openings in the first element of the steel cap with the second element contacting the existing tower, connecting the first element to the new foundation elements, and connecting the second element to the existing tower.

BRIEF DESCRIPTION OF THE DRAWING

The present invention is described further by way of example only with reference to the accompanying drawings of which.

DESCRIPTION OF EMBODIMENTS

The invention is concerned with providing support for an existing tower, such as an electricity transmission tower or another type of tower, and the structure of the existing tower is a secondary consideration. The existing tower may be of any type, such as a lattice tower or a monopole tower, used for any purpose. The existing tower includes a foundation and a tower structure extending from and supported by the existing foundation.

Figure 2:
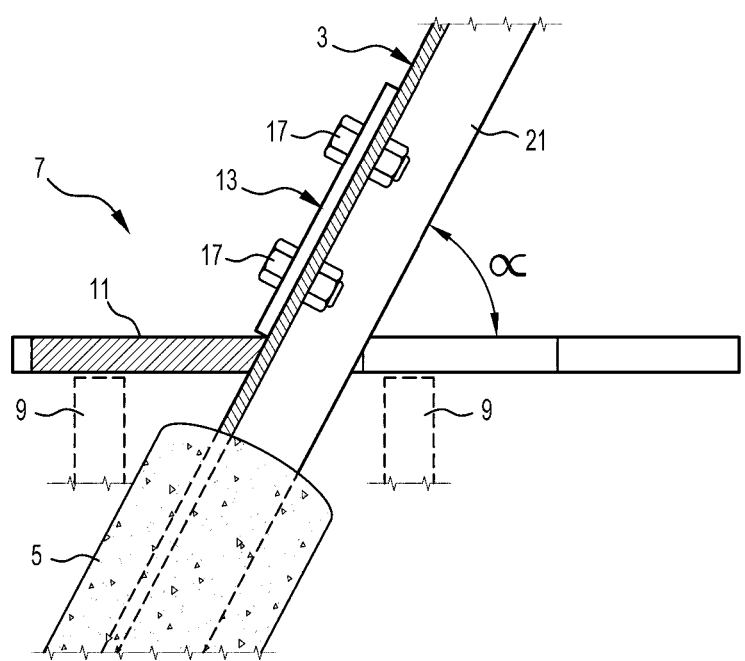
FIG. 2 is a section along the line 2-2 in FIG. 3 and shows a vertical cross-section through a part of an embodiment of a renovated tower in accordance with the invention that comprises a part of an existing tower, a part of a new foundation for the existing tower and the steel cap shown in FIG. 1 structurally interconnecting the new foundation and the existing tower leg.

The vertical cross-section of FIG. 2 shows a part of a renovated tower that comprises:

(a) one leg 3 of an existing tower, (b) two foundation elements in the form of new piles 9 that have been driven into the ground (but could be otherwise embedded in the ground) and form a part of a new, i.e. an additional foundation for the existing tower leg 3, and (c) a steel cap generally identified by the numeral 7 structurally interconnecting the piles 9 of the new foundation and the existing tower leg 3 so that the new foundation structurally supports the existing tower leg 3.

It is noted that the leg 3 may be an element that forms part of the tower structure or part of the tower foundation.

The existing tower shown in FIG. 2 includes a foundation in the form of a concrete block 5 that supports the existing tower leg 3. The existing tower leg 3 is in the form of a steel post 21 extending from the block 5. In this arrangement, the steel post 21 is formed from steel plate and has an outer profile that is V-shaped in transverse section.

As mentioned above, the new foundation for the existing tower leg 3 includes two new piles 9 as shown in FIG. 2. Whilst not shown in the vertical cross-section of FIG. 2, the new foundation also includes another two new piles 9. The invention is not confined to the number of new piles 9 for the new foundation.

The new piles 9 may be of any suitable construction. For example, each pile 9 may be composite micro-pile comprising a steel casing filled with grout and a high-strength central piece of threaded reinforcing steel. In use, the cased section is installed in a drilled hole in the ground and provides lateral resistance and the reinforcing bar and grout are positioned and injected respectively in the space defined by the casing and provide axial resistance.

The number and type and arrangement of the new piles 9 or other new foundation elements may be as required given the geology of a site of the existing tower and the structural properties required to support the existing tower leg 3 and the accessibility of the site. One key consideration is to locate the new piles 9 of the new foundation so that the process of drilling and installing the piles 9 or other process for embedding/forming the piles in the ground does not interfere with the structure and therefore the viability of the existing tower.

The steel cap 7 shown in FIG. 2 is spaced above the ground and comprises a first element in the form of a flat steel plate 11 that has four openings 15 cut or punched in the plate 11 for receiving the four piles 9 of the new foundation.

The steel cap 7 also comprises a second element in the form of a length of a shaped steel plate 13 for connecting the steel cap 7 to the existing tower leg 3. The shaped steel plate 13 is V-shaped in transverse section to conform to the V-shaped outer profile of the steel post 21 of the existing tower leg 3 to maximum contact of the shaped steel plate 13 and the steel post 21.

Figure 1:
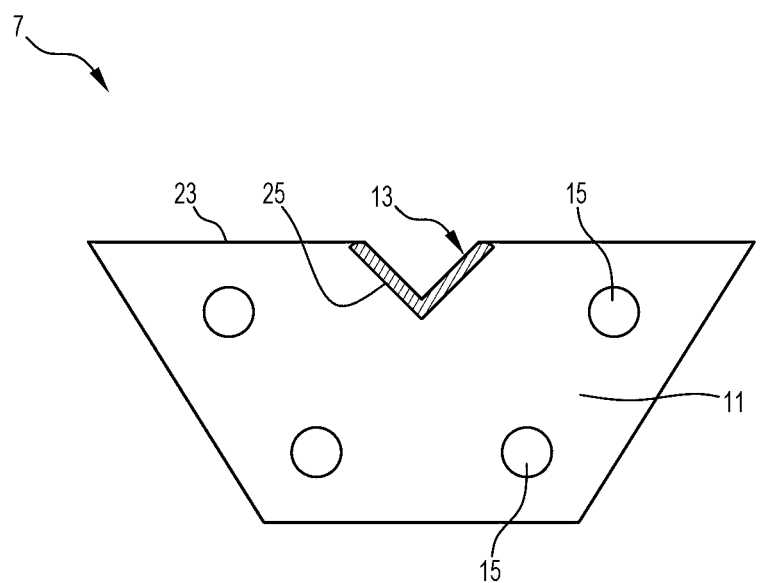
FIG. 1 is a top plan view of an embodiment of a steel cap in accordance with the invention.
Figure 3:
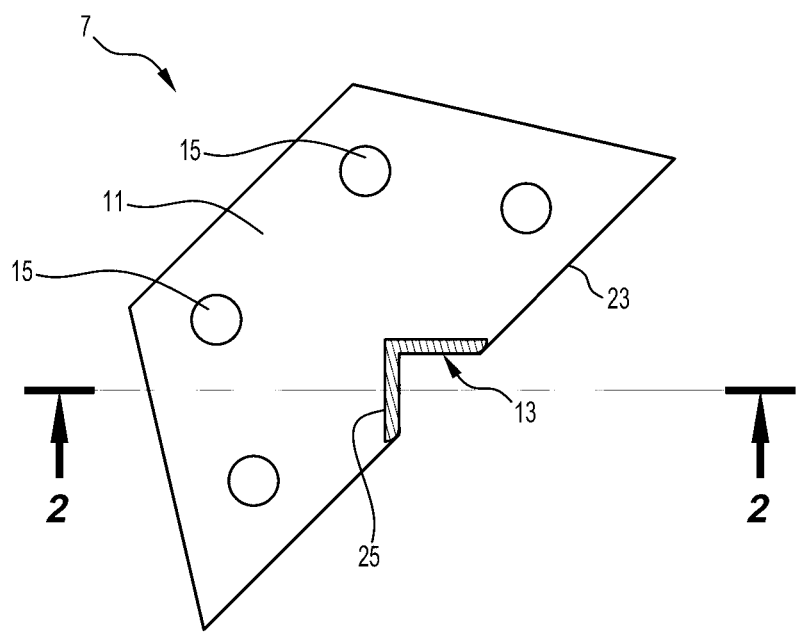
FIG. 3 is a horizontal cross-section through the part of the renovated tower shown in FIG. 2.

The steel plate 11 is formed to extend 180° around the perimeter of the existing tower leg 3. Specifically, as can be seen in FIGS. 1 and 3, the plate 11 has a V-shaped cut-out section 25, which may also be suitably described as a notch, that is centrally positioned in one side of the plate and is aligned with the shaped steel plate 13. The V-shaped notch 25 conforms to the V-shaped transverse section of the V-shaped outer profile of the steel post 21 of the existing tower leg 3 and thereby extends 180° around the perimeter of the existing tower leg 3.

There may be situations where a single steel cap 7 is sufficient. There may also be situations where more than one steel cap 7 is required.

The steel plate 11 may be any suitable thickness and steel grade and has an inner edge 23 that has the above-described V-shaped notch 25. The angled steel plate 13 is located in the notch 25 and welded to the steel plate 11.

The shaped steel plate 13 extends at an angle α (see FIG. 2) to the flat surface of the steel plate 11. The angle α is selected to be the same as the angle to the horizontal of the steel post 21 of the existing tower leg 3.

With the above arrangement, in use, when the steel plate 11 is positioned horizontally adjacent the existing tower leg 3 with the shaped steel plate 13 against the steel post 21 of the existing tower leg 3, there is maximum contact of the shaped steel plate 13 and the steel post 21 of the existing tower leg 3 along the length of the shaped steel plate 13.

In use, typically, (a) the new piles 9 are driven/embedded/formed or otherwise positioned in the ground in a required array around an existing tower leg 3 to form the new foundation for the leg 3, (b) the steel cap 7 is positioned on an upper surface of the new piles 11 with upper threaded ends of the new piles extending through the openings 15 in the steel plate 11 of the steel cap 7 and nuts threaded onto the threaded ends thereby connecting the steel plate 11 to the new piles 11, with the shaped steel plate 13 contacting the outer surface of the exiting tower leg 3, and (c) the shaped steel plate 13 is connected to the existing tower leg 3 by fasteners 17, in the form of nuts and bolt pairs, thereby completing the new foundation and the consequential additional structural support for the existing tower leg 3 and, by extension, the tower.

The threaded ends of the new piles 9 and the nuts mentioned in paragraph (b) above form fastening assemblies that are generally identified by the numeral 29 in FIG. 2.

It can be appreciated that the steel cap 7 is an efficient and effective option for interconnecting the new foundation (specifically the piles 9) and the existing tower leg 3 and providing required additional structural support for the existing tower leg 3 and, by extension, the tower.

In the embodiment of the steel cap 7 shown in FIGS. 1-3, the steel plate 11 is formed with four openings 15 for four new piles 9 of the new foundation. The invention is not limited to this number of openings.

Figure 4:
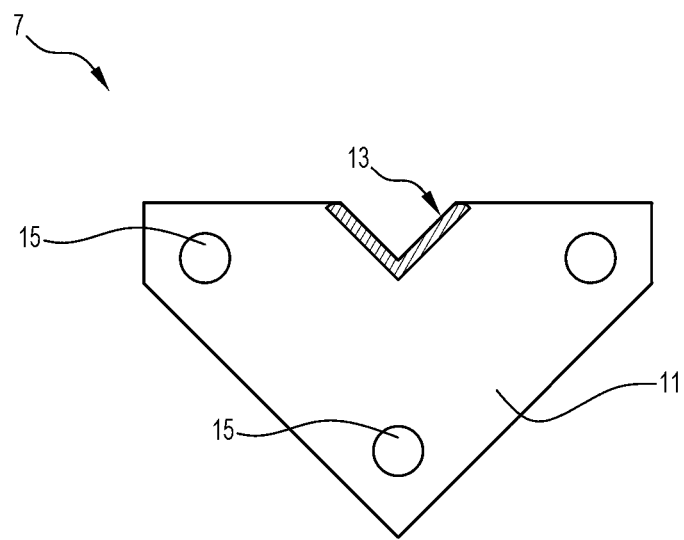
FIG. 4 is a top plan view of another embodiment of a steel cap in accordance with the invention.

The embodiment of the steel cap 7 shown in FIG. 4 has three openings 15.

Figure 5:
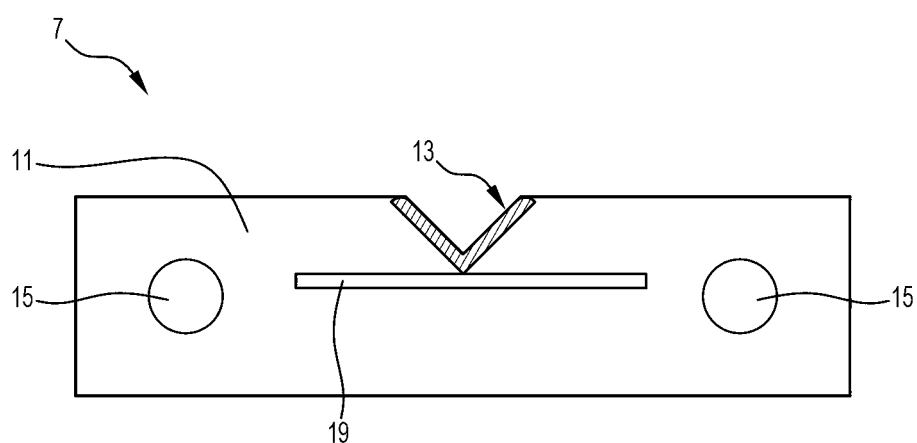
FIG. 5 is a top plan view of another embodiment of a steel cap in accordance with the invention.

The embodiment of the steel cap 7 shown in FIG. 5 has two openings 15. The FIG. 5 embodiment also includes reinforcement in the form of a stiffening rib 19 welded or otherwise connected to one surface of the steel plate 11.

Figure 6:
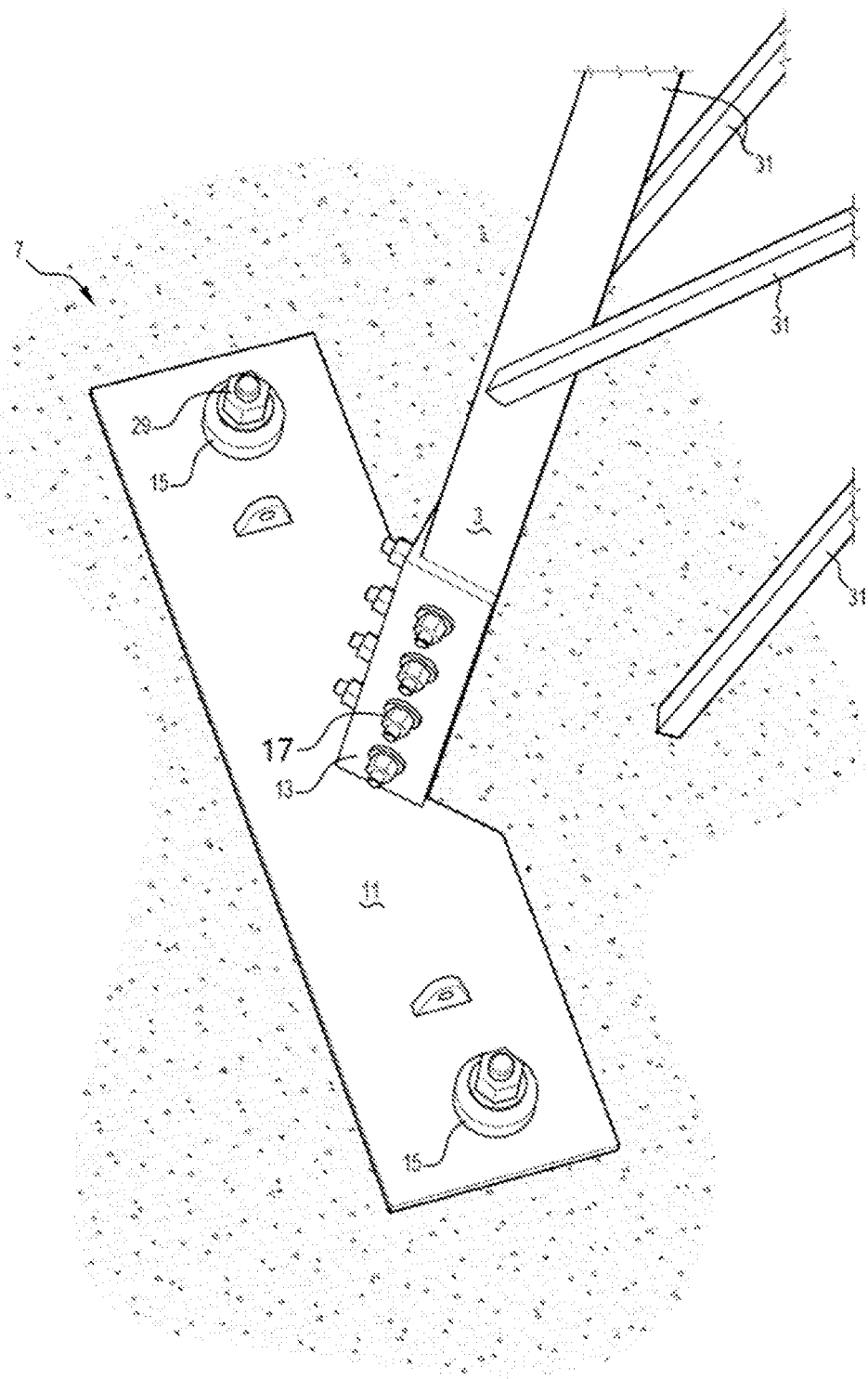
FIG. 6 is a perspective view of another, although not the only possible other, embodiment of a renovated tower in accordance with the invention that comprises a part of an existing tower, a part of a new foundation for the existing tower and another embodiment of steel cap in accordance with the invention structurally interconnecting the new foundation and the existing tower.

The embodiment of the renovated tower shown in FIG. 6 is very similar to the FIGS. 1-3 embodiment and the same reference numerals are used to describe the same structural features. It is noted that the two new piles 9 of the new foundation are not shown in the Figure as the piles are completely within the ground, with the steel plate 11 of the steel cap 7 in the ground and positioned over the new piles 9. Locating the new piles 9 completely within the ground is the main feature of the FIG. 6 embodiment when compared with the FIGS. 1-3 embodiment. In the FIGS. 1-3 embodiment the steel cap 7 is spaced above the ground. It is also noted that the Figure shows three members 31 that are bracing members for the existing tower and these members 31 are not shown in the FIG. 2 embodiment.

When present, as is often the case, the bracing members 31 may have an impact on the shape of the steel plate 11 of the steel cap 7. This is a design issue that is illustrated by the embodiment shown in FIG. 7.

Figure 7:
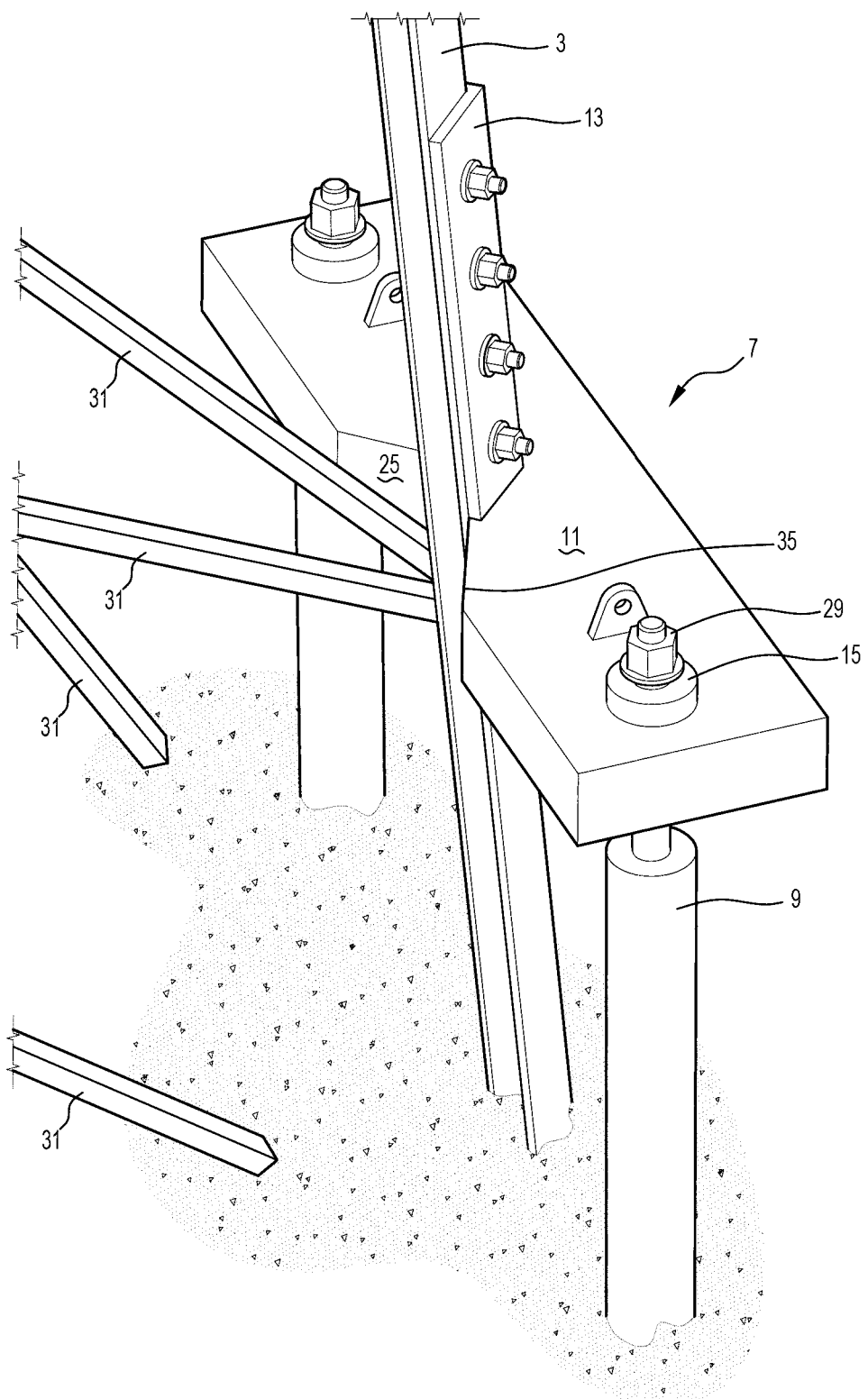
FIG. 7 is a perspective view of another, although not the only possible other, embodiment of a renovated tower in accordance with the invention that comprises a part of an existing tower, a part of a new foundation for the existing tower and another embodiment of steel cap in accordance with the invention structurally interconnecting the new foundation and the existing tower.

The embodiment of the renovated tower shown in FIG. 7 is very similar to the FIG. 6 embodiment and the same reference numerals are used to describe the same structural features. In the FIG. 7 embodiment, the steel cap 7 is spaced above the ground and the new piles 9 are not embedded in the ground to the same extent as shown in FIG. 6. It can be appreciated from FIG. 7 that if it was desired to position the steel cap 7 closer to the ground, the bracing members 31 would have an impact and it would be necessary to re-engineer the steel plate 11 to make the cut-out section 25 larger as illustrated by the line 35.

Many modifications may be made to the embodiments of the present invention described above without departing from the spirit and scope of the invention.

By way of example, in the embodiment of the steel cap 7 shown in FIGS. 1-3, the steel plate 11 is formed to extend 180° around the perimeter of the existing tower leg 3. The present invention is not confined to this arrangement and the steel plate may be formed to extend around any selected part of the perimeter of the existing tower leg 3.

The invention claimed is:

1. A steel cap for structurally directly connecting together a new foundation and an existing tower, with the new foundation including at least one foundation pile positioned in the ground, and with the existing tower including an existing foundation and a tower structure extending from and supported by the existing foundation, the steel cap comprising (a) a first element for connecting the cap to the new foundation pile or piles, with the first element being formed to extend in use around at least a part of the existing tower and (b) a second element extending from the first element for directly connecting the cap to the existing tower and thereby, in use, directly connecting together the new foundation and the existing tower, wherein the first element is a plate which includes a cut-out section in a side wall of the plate that has a same shape as a part of a transverse section of a leg of the existing tower so that in use the first element is positioned against and extends around at least a part of an outer profile of the existing tower, and wherein the second element includes a plurality of openings to receive bolts for directly bolting the second element to the existing tower and thereby directly connecting the cap to the existing tower.

2. The steel cap defined in claim 1, wherein the plate is a flat steel plate.

3. The steel cap defined in claim 1, wherein the plate includes an opening for the foundation element of the new foundation or a plurality of openings for the multiple foundation elements of the new foundation so that the plate can be connected, to the single or multiple foundation elements.

4. The steel cap defined in claim 1 wherein the first element is formed to be positioned against the existing tower.

5. The steel cap defined in claim 1 wherein the second element is shaped to conform to the outer profile of the existing tower to maximize contact between the second element and the existing tower.

6. The steel cap defined in claim 1 wherein the second element is welded to the first element.

7. The steel cap defined in claim 1 wherein the second element is an elongate element.

8. The steel cap defined in claim 1 wherein the second element is a shaped plate along a length of the plate so that in use the shaped plate conforms to the outer profile of the existing tower to maximize contact between the second element and the existing tower.

9. The steel cap defined in claim 8 wherein the shaped plate extends from the first element at an angle to a plane of the first element, with the angle α being selected to be a same angle as an angle to a horizontal of a leg of the existing tower to which in use the steel cap is connected.

10. The steel cap defined in claim 8 wherein the shaped plate is a V-shape in transverse section.

11. An assembly of (a) a new foundation for an existing tower, and (b) the steel cap defined in claim 1 connected to the new foundation for extending a service life of the tower when the assembly is structurally directly connected to the existing tower, with the first element of the steel cap connecting the cap to the new foundation pile or piles and extending around at least a part of the existing tower, and with the second element of the steel cap extending from the first element and directly connecting the cap to the existing tower and thereby directly connecting together the new foundation and the existing tower.

12. The assembly defined in claim 11 wherein the first element of the steel cap is bolted or welded to the foundation element or foundation elements of the new foundation.

13. The assembly defined in claim 11 wherein the first element of the steel cap is positioned on or at least partially embedded in the ground.

14. The assembly defined in claim 11 wherein the first element of the steel cap is spaced above the ground.

15. A method of renovating an existing tower that comprises (a) positioning a plurality of new foundation elements in the ground in an array around an existing tower and thereby forming a new foundation of the tower, positioning the steel cap defined in claim 1 so that the new foundation elements extend through openings in the first element of the steel cap with the second element extending from the first element and directly contacting the existing tower, connecting the first element to the new foundation elements, and directly connecting the second element to the existing tower.

* * * * *